May 13, 1952     H. R. HAMMETT     2,596,399
FIRE EXTINGUISHING APPARATUS
Filed Feb. 10, 1950
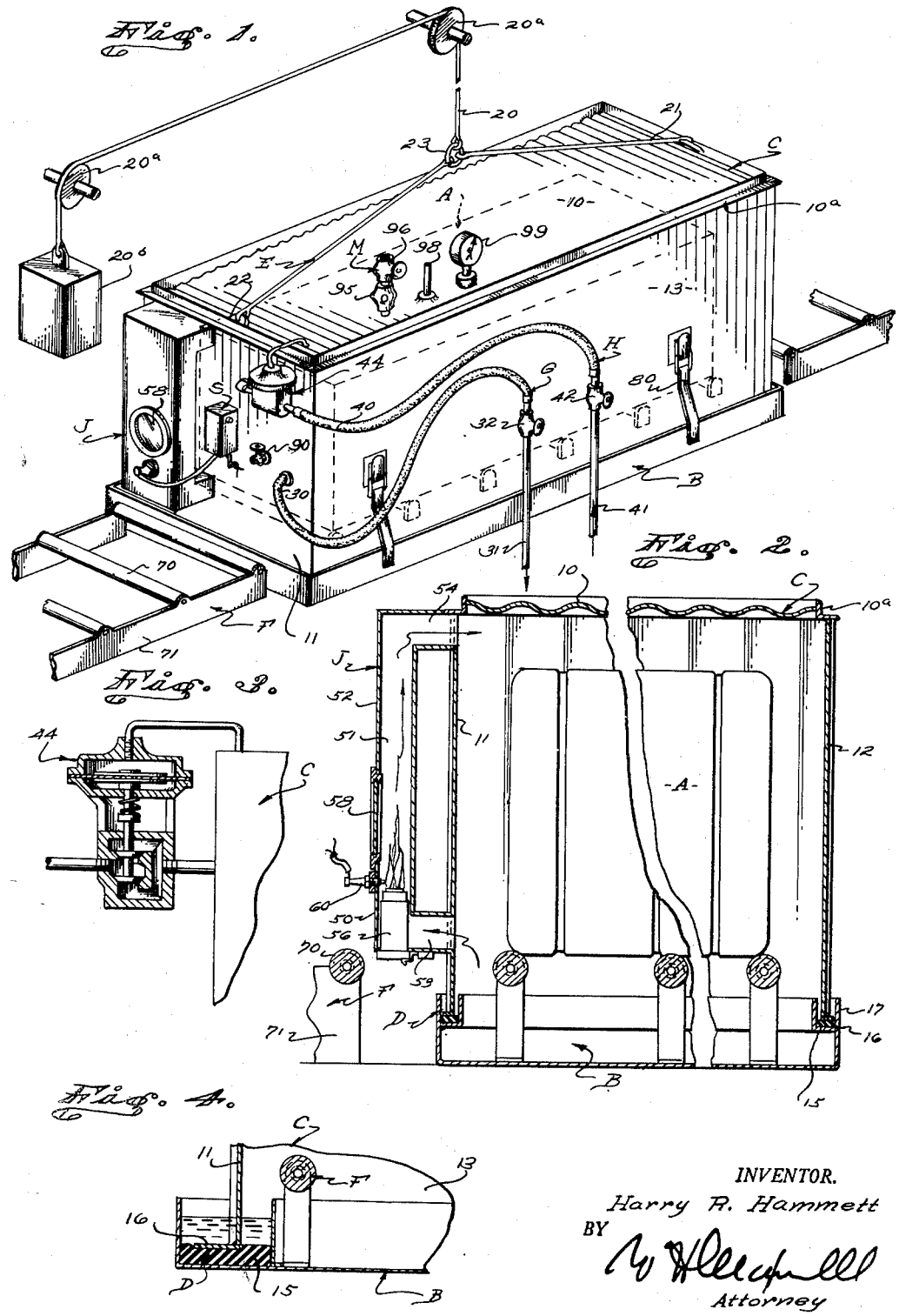
INVENTOR.
Harry R. Hammett
BY
Attorney Patented May 13, 1952

2,596,399

UNITED STATES PATENT OFFICE 2,596,399

FIRE EXTINGUISHING APPARATUS

Harry R. Hammett, Bakersfield, Calif.

Application February 10, 1950, Serial No. 143,396

4 Claims. (Cl. 169—2)

This invention has to do with a fire extinguishing apparatus and it is a general object of the invention to provide simple practical effective apparatus for extinguishing fires such as occur in baled material.

It is common in handling cotton for transportation to points where it is cleaned, treated, or manufactured into usable articles, to bale it into large bundles or masses which are suitably bound or tied and which greatly simplify storing and handling operations. As cotton is handled preliminary to baling, care is generally exercised to minimize conditions conducive of fires, but in spite of this, it is not infrequent that a bale of cotton, as it is delivered from the baling apparatus, has a fire started in it. Such ignited bales burn slowly and it may be very dangerous and become active after being stored or in the course of being transported.

The operators of baling equipment endeavor to detect bales that may be on fire and such bales are commonly set aside, and because of the nature of the fires and the materials involved, much time is lost in checking suspicious bales for the presence of fires, or in extinguishing fires that do exist.

It is a general object of this invention to provide fire extinguishing apparatus suitable for extinguishing fires occurring in bales of cotton, or the like, and which is such that a burning or suspicious bale of cotton can be handled easily and rapidly in such manner as to extinguish any fire present in the bale and thus render the bale safe for handling and storage with other bales.

A further object of this invention is to provide apparatus of the general character referred to which is simple and inexpensive of manufacture and which involves few simple parts requiring manipulation or operation.

It is another object of the invention to provide fire extinguishing apparatus in which a container is provided to encase a bale which is on fire or which is suspected of being on fire, and a means which consumes oxygen present in the container and throughout the bale within the container so that fire in or on the bale is effectively extinguished.

Another object of the invention is to provide apparatus of the general character referred to which serves to quickly and effectively establish an atmosphere throughout the bale which is such that it will not support combustion.

The apparatus provided by the present invention involves, generally, a container established by two relatively simple sections, one a base section which may be stationary and the other a hood section which operates vertically relative to the base section. When the hood section is elevated a bale is arranged on the base following which the hood section is lowered into engagement with the base section. A seal provided between the sections is effective in sealing the bale within the container. The seal preferably involves a washer or gasket like element acting between the sections of the container and if desired, a liquid may be employed to establish, or aid in establishing the desired seal. A bale carrier is provided to facilitate movement of a bale of material such as cotton to and from the container and it preferably involves an elongate structure with longitudinally spaced rollers that extend transversely of the structure. The carrier has a center section occurring on or over the base of the container and has end sections at the exterior of the container and projecting from the ends thereof. The invention provides means for exhausting air or gases from the container and means for supplying an inert gas to the container which latter means is preferably under control of an automatic pressure regulator. A means is provided for consuming oxygen within the container and involves a burner in a combustion chamber which is in communication with the interior of the container.

The various objects and features of my invention will be fully understood from the following detailed description of the typical preferred forms and applications of the invention, throughout which description reference is made to the accompanying drawings, in which:

Fig. 1 is a perspective view illustrating apparatus provided by the present invention showing the container closed with a bale housed therein. Fig. 2 is an enlarged detailed longitudinal sectional view of the container taken through the combustion chamber that occurs at one end of the container and illustrates one form of seal between the two sections of the container. Fig. 3 is an enlarged view illustrating the pressure regulator controlling the admission of inert gas into the container and Fig. 4 is an enlarged view illustrating in detail another form of seal provided that may be between the two sections of the container.

The apparatus provided by this invention is suitable for extinguishing fires present in or occurring on objects of various kinds or formed of various materials. The invention is particularly practical for the handling of baled material that may be on fire or which may be suspected of being on fire. For purpose of illustration reference will here be made to cotton as the material being handled and the cotton will be referred to as being handled in the form of a bale A.

The apparatus of the present invention involves, generally, a container formed of a stationary base section B and a vertically movable hood section C. A seal or sealing means D acts between the sections of the container when the hood is in operating position relative to the base to provide an air or gas-tight connection between the sections. A suitable supporting means E is provided for handling the hood section of the container and a suitable carrier F is provided for handling a bale A in the course of its being operated to and from position to occur within the container. An exhaust means G is provided for exhausting air or gas from within the container and a means H is provided for supplying inert gas to the container. In accordance with the invention a means J is provided for consuming oxygen that may be present in the container and I may also provide a means M serving to relieve pressure from the container.

The container formed or established by the base B and hood C may in practice be varied widely in size, shape and proportioning, depending upon the objects or units to be handled by the apparatus. In a case where bales of cotton, or the like, are to be handled the container is an elongate box-like structure in which case the base B may be a flat horizontally disposed member rectangular in plan configuration and made somewhat elongate as shown in the drawings. The hood C in the case illustrated is a simple downwardly opening box-like section having a top 10, vertical ends 11 and 12 and vertical sides 13. The hood C is preferably made to correspond generally in plan configuration with the base B and it is made of such height as to adequately accommodate the objects or units that are to be handled by the apparatus.

In practice, the hood C may be constructed of flat corrugated sheets of material so that substantial pressures may be handled. When corrugated material is used as illustrated throughout the drawings, to form the parts 10, 11, 12 and 13 of the hood, a frame part 10ª may be provided at the top of the hood C where the ends 11 and 12, and sides 13 join the top 10. The parts 10, 11, 12 and 13 are joined to the part 10ª, as by welding, providing a simple effective structure.

The sealing means D may in practice vary widely in form and construction, this element of the structure being provided primarily to establish a pressure or gas-tight connection between the sections of the container. In the particular case illustrated a sealing member 15 is carried by the base B of the container at the peripheral portion thereof. Member 15, may, in practice, be a gasket or washer of rubber or other suitable sealing material. The seal 15 may be so arranged and so proportioned as to receive the lower edges of the ends and sides of the hood, which elements are shown as provided with sealing flanges 16 which engage and seal with the sealing member 15 when the hood is in operating position. In the form of the invention illustrated the sealing member 15 is rotated at the bottom of an upwardly opening trough-like structure 17 provided at the periphery of base B in which case a liquid, such as water, may be carried in the trough, either to act in place of or to supplement the action of sealing member 15 as may be desired.

The supporting means E is provided in connection with the hood C to couple it with an operating line 20, or the like. In the particular case illustrated, the means E is shown as involving links 21 having their outer ends attached to suitable brackets 22 at the ends of the hood and having their inner ends joined by a ring 23 to which the line 20 may be connected. The line 20 may be operated over pulleys 20ª and may have a depending free end carrying a weight 20ᵇ that counterbalances the weight of the hood making it easy to operate the hood vertically into and out of engagement with the base. The equipment thus provided may be very simple of construction and is convenient to operate as it is only necessary to operate the hood vertically through a distance sufficient to allow bales A to be moved into and out of position in the container.

The exhaust means G is provided for evacuating or exhausting air or gases from the container and in the case illustrated it is shown as involving a flexible line 30 extending from the hood to an exhaust pipe 31 which is under control of a valve 32. It will be understood that the exhaust pipe 31 may be connected to a vacuum pump or other point where a reduced pressure is maintained, and when the valve 32 is opened air or gas is exhausted from the container.

The means H provided for supplying inert gas to the container is shown as involving a flexible supply line 40 extending from a supply pipe 41 to the hood C. Flow of inert gas is under control of a main control valve 42, which is preferably a manually operated valve, and it is preferred that the flow of inert gas be further controlled by a suitable pressure regulator 44. The pressure regulator 44 may be such that the supply line 40 is opened to deliver inert gas to the hood when a predetermined differential of pressure occurs between the interior and exterior of the hood, whether such differential is established by operation of the means G or operation of the means J or by the combined operation of these means.

The means J provided for consuming oxygen present in the hood preferably includes a suitable burner 50 operating in a combustion chamber 51 formed by a duct 52 which has communication with the interior of the container. In the particular case illustrated the duct 51 is a vertically disposed element at the exterior of the container and at one end of the hood C and it is joined with the hood to be in communication therewith. The desired connection between the duct 51 and the hood is provided by a bottom connection 53 and a top connection 54. The burner 50 is shown located in the lower portion of the duct 51 and is shown as being a wick type burner supplied with suitable liquid fuel from a detachable container 56. The duct is shown provided with a suitably closed sight opening 58 so that the operation of the burner can be readily observed from the exterior of the duct 52. In the case illustrated an electrical igniter 60 is provided for igniting the burner and is under control of a suitable switch S.

The carrier F provided for handling bales of cotton A is an elongate structure extending lengthwise of the container hereinabove described and in the case illustrated it is formed of a plurality of rollers 70 carried by suitable mounting brackets 71, so that they extend transversely of the carrier and are spaced apart longitudinally of the structure. The carrier F has a middle section occurring within the container and supported by the base of the container and it has end sections that extend from or beyond the ends of the base. Through this construction a bale A may be placed on either end of the carrier F and when the hood C is elevated the bale can be readily moved into position over the base and beneath the hood following which the hood can be lowered over the bale. After the fire has been extinguished, or the bale has been treated, the hood can be elevated and the bale shifted in either direction from the center section of the carrier to one of the end sections thereof. The flexibility of the several lines connected to the hood allows the hood to be operated vertically without disturbing any of the desired connections.

In operating the apparatus provided by the present invention a bale A of cotton, or the like, which is burning, or is suspected of being on fire, is operated over one end section of carrier F to position over the bases B whereupon the hood C is lowered until the sealing means D becomes effective. The weight of the hood C may be sufficient to establish the desired seal. If a pressure condition is to develop or if it is desired to mechanically supplement the weight of the hood C, suitable releasable fasteners 80 may be provided between the base and hood at the exterior of the container as indicated in Fig. 1 of the drawings. With the hood down and sealed the bale A within the container is completely housed and sealed from the atmosphere surrounding the apparatus.

The apparatus may, in practice, be operated in various manners, for example, it is merely necessary to operate the means J by igniting the burner F allowing it to continue to burn until the oxygen within the hood has been consumed and will no longer support combustion. This operation will ordinarily result in a reduction of pressure within the container which can be relieved, when the flame has burned out and when it is desired to elevate the hood, by opening a valve controlled pressure relieving means 90.

The means M is shown as involving a check valve 95 controlling flow of gas from the hood and a stop valve 96 in series with valve 95. When a burning bale is confined in the container pressure may develop in the container unless escape is provided as by way of the check valve 95. The valve 96 is normally open so any excess pressure in the container is relieved without allowing air to enter the container even when a reduced pressure is established therein. The stop valve 96 is provided so that the means of air can be shut off or rendered inoperative if desired.

In practice the container may be equipped with a thermometer 98 to indicate the temperature prevailing in the container and a pressure gauge 99 may be provided to indicate the pressure in the container whether above or below atmosphere.

To expedite the operation above described it may be desired to initially exhaust a portion of the air from the container by operation of the means G and whether this operation is performed or not, it may be desired to introduce inert gas as by operation of the means H. Inert gas may be introduced to equalize pressure inside the container with that outside the container or to establish a positive pressure in the container.

For full operation of the apparatus employing the various means provided, the means G is first operated and the means H is then operated, the regulator 44 thereof being so set and adjusted that when a predetermined differential of pressure occurs between the inside and outside of the container inert gas is discharged into the container. Simultaneously with these operations, or following them, the means J may be operated and is continued in operation until the atmosphere within the container is such that it will not support combustion.

By exhausting air from the container, for instance, by operating means G preliminary to operating means H, so that a substantial reduction of pressure occurs within the container, air is exhausted from throughout the bale A, thus taking oxygen from any fire occurring within the bale. If, following the exhausting operation, inert gas is introduced, it finds its way throughout the bale and is effective in extinguishing or smothering fire present in the bale. Inert gas may be introduced so that the pressure in the container is brought back to that of atmosphere or if desired inert gas can be introduced to establish a super-atmospheric pressure in the container. By the operation of the means G and H together with the means J effective circulation of air or gas occurring within the container and throughout the bale and the oxygen present is rapidly consumed by the flame at the burner 50. In practice, the reduction of pressure within the container due to operation of means J results in effectively seating the hood on the seal so that means such as fasteners 80 are ordinarily not required to hold the hood in connection with the base.

Having described only typical preferred forms and applications of my invention, I do not wish to be limited or restricted to the specific details herein set forth, but wish to reserve to myself any variations or modifications that may appear to those skilled in the art, and fall within the scope of the following claims.

Having described my invention, I claim:

1. Fire extinguishing apparatus including, a container having two separable sections defining a chamber adapted to carry combustible material, one section being a base and the other a hood, and sealing means sealing between the sections when the hood is engaged on the base, and means consuming oxygen in the container including, a combustion chamber supported by and in communication with the container and a burner operating in the chamber to consume oxygen from the container, the burner being adapted to generate a flame confined to the chamber and removed from the chamber of the container.

2. Fire extinguishing apparatus including, a container having two separable sections defining a chamber adapted to carry combustible material, one section being a stationary base and the other a hood shiftable relative to the base, and sealing means sealing between the sections when the hood is engaged on the base, and a burner carried by the hood and in communication with said chamber and adapted to generate a flame removed from the chamber to consume oxygen from the container.

3. Fire extinguishing apparatus including, a container having two separable sections defining a chamber adapted to carry a bale of combustible material, one a base and the other a hood, and sealing means sealing between the sections when the hood is engaged on the base, a horizontally disposed carrier with a portion in the container and a portion at the exterior of the container, the carrier supporting a bale for movement into and out of the container, and means consuming oxygen in the container including, a combustion chamber at the exterior of the container and in communication with the chamber of the container and a burner operating in the combustion chamber and adapted to generate a flame confined to the combustion chamber.

4. Fire extinguishing apparatus including, a container having two separable sections defining a chamber adapted to carry combustible material, one section being a stationary base and the other a vertically shiftable hood, and sealing means sealing between the sections when the hood is engaged on the base, a gas supply stationary relative to the base, means exhausting gases from the hood including a flexible gas handling line having one end connected to the gas supply and the other end connected to the hood, and a burner carried by the hood at the exterior thereof to shift therewith in connection with the chamber to consume oxygen from the chamber.

HARRY R. HAMMETT.

REFERENCES CITED

The following references are of record in the file of this patent:

UNITED STATES PATENTS

| Number | Name | Date |
|---|---|---|
| 283,996 | Garfield | Aug. 28, 1883 |
| 661,496 | Clayton | Nov. 13, 1900 |
| 1,254,582 | Decker | Jan. 22, 1918 |
| 1,599,826 | Lienhard | Sept. 14, 1926 |